United States Patent [19]
Hunsucker et al.

[11] 3,748,309
[45] July 24, 1973

[54] POLYESTER RESINS FROM POLYAMINES AND PHTHALIC ACIDS

[75] Inventors: Jerry H. Hunsucker, Terre Haute; Daniel G. Mudd, Brazil, both of Ind.

[73] Assignee: Commercial Solvents Corporation, Terre Haute, Ind.

[22] Filed: May 12, 1971

[21] Appl. No.: 142,779

[52] U.S. Cl............ 260/75 N, 260/28, 260/29.6 NR
[51] Int. Cl.............................................. C08g 17/08
[58] Field of Search.................................... 260/75 N

[56] References Cited
UNITED STATES PATENTS
3,366,591   1/1968   Marshall et al.................... 260/32.6
3,624,181   11/1971  Munakata et al................... 260/860

FOREIGN PATENTS OR APPLICATIONS
1,352,755   2/1964   France
1,122,647   1/1962   Germany Primary Examiner—Melvin Goldstein
Attorney—Howard E. Post and Robert H. Dewey

[57] ABSTRACT

Resinous polyester compositions having particular utility in emulsion wax preparations to promote leveling. The resin is the product of the dehydration reaction of an aminoalkanediol or triol with phthalic acid.

6 Claims, No Drawings

POLYESTER RESINS FROM POLYAMINES AND PHTHALIC ACIDS

BACKGROUND OF THE INVENTION

This invention relates to resinous polyester compositions. In a particular aspect, this invention relates to resinous polyester compositions of alkanolamines and phthalic acid.

Emulsion waxes, also known as "self-polishing" floor waxes, have been in large scale commerical production for many years. Originally these products were based on aqueous emulsions of natural waxes, such as carnauba, but because of their rather dark color, the natural waxes have been largely displaced by colorless synthetic polymers.

The success of these emulsions has been largely dependent on the property of good leveling so that a glossy finish is obtained without buffing or polishing. The property of good leveling derives from a combination of several physical properties such as viscosity, surface tension and interfacial tension of the liquid wax formulation against the substratum. Dilantancy and thixotropism are also factors (adverse). Very poor leveling is generally characterized by the tendency of the emulsion, when placed in contact with a substrate, to become discontinuous and to reduce to a minimum the exposed surface area, as by formation of globules, puddles, etc. The epitome of good leveling is the tendency of the emulsion to spread to a maximum surface area and to form a continuous, uniform film over the substrate. Leveling is difficult to measure quantitatively. Reflectometer readings have been used, but they are generally less satisfactory than visual inspection. Inasmuch as appearance is the real criterion of leveling, visual observation is fully acceptable to those skilled in the art.

Emulsions of most natural waxes and synthetic polymers exhibit poor leveling, so it has long been the practice to incorporate in the emulsion one or more components which promote leveling. These components are generally designated leveling agents and they perform the additional function of providing a continuous dried film on the substrate. Without such an agent present, the wax or polymer would be present as discontinuous particles having little or no durability.

Many materials, such as shellac, have been used as leveling agents but most of them have been highly colored, resulting in a yellowish and unattractive wax film. Other typical materials presently in use include fumaric adducts with rosin treated with polyols, polyesters or modified polyesters. These leveling agents have been successful, but freedom from color without loss of other desirable properties has long been a problem. Also, improvement in gloss would be desirable, since the appearance depends on the gloss. Accordingly a need exists for improved leveling agents.

SUMMARY OF THE INVENTION

It is an object of this invention to provide resinous polyester compositions.

It is another object of this invention to provide a method of improving the leveling properties of emulsion waxes.

Still other objects of this invention will be apparent to those skilled in the art from the disclosure herein.

There have been discovered resinous polyester compositions obtained by reacting phthalic acid, or a mixture of isomers thereof, with an aliphatic, primary polyolamine, or mixture thereof, corresponding to the formula $$HOCH_2-\underset{\underset{NH_2}{|}}{\overset{\overset{R}{|}}{C}}-CH_2OH$$

wherein R can be methyl, ethyl or hydroxymethyl. These resinous compositions make it possible to provide a method of improving the leveling of aqueous emulsion waxes.

To prepare the compositions of this invention, the polyolamine and phthalic acid are reacted in a ratio of about 1.0–1.75 moles of phthalic acid per mole of polyol at a temperature in the range of about 150°–200°C. The resulting acidic polyester is then neutralized with ammonia to render it water-soluble and it is employed as the leveling agent in emulsion waxes at a concentration of about 15 percent by volume of a 15% by weight aqueous solution.

DETAILED DISCUSSION

It is believed that the reaction of phthalic acid with the polyolamine proceeds as follows:

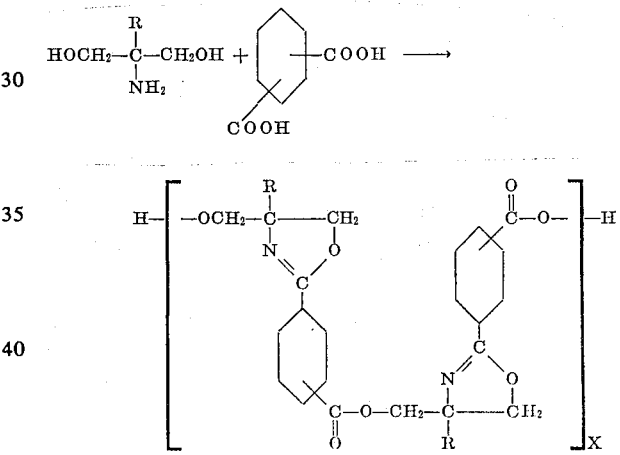

The value of $x$ is not known.

It is known that isophthalic acid and tris(hydroxymethyl)aminomethane (TA) react in a 1:1 mole ratio to form polyester resins containing oxazoline groups. However no utility has previously been reported for these resins. It is also known to prepare alkyd-type drying oils by reacting soya fatty acids with TA to form an oxazoline, then reacting the oxazoline with isophthalic acid. The resulting product is further treated with paraformaldehyde to form the finished drying oil. Products of this type have been found useful in emulsion paints, but they are not useful as leveling agents in emulsion waxes.

It is also known that o-phthalic acid (or its anhydride) react with TA to form, not polyesters, but dark-colored cyclic imines which are relatively useless. It has been discovered, however, that resins useful in this invention can be prepared with TA and o-phthalic acid (or anhydride), as set forth in greater detail hereinbelow and in the examples.

The aliphatic polyolamines suitable for the practice of the present invention include but are not limited to 2-amino-2-methyl-1,3-propanediol; 2-amino-2-ethyl- 1,3-propanediol; and 2-amino-2-hydroxymethyl-1,3-propanediol (otherwise known as tris(hydroxymethyl)aminomethane, or TA). These polyolamines are commerically available and the usual commerical products are suitable for the practice of this invention. Preferably the polyolamine is a mixture of 2-amino-2-hydroxymethyl-1,3-propanediol, about 0.25 moles, with about 1 mole of either of the other two listed, or a mixture thereof. Maximum leveling and gloss are attained at this ratio.

The phthalic acids and o-phthalic anhydride are also commercially available and o-phthalic anhydride can be used in place of o-phthalic acid. Good quality products are preferred. A mixture of phthalic acids in any proportion can also be used for preparing the resins. Generally, however, para- or meta-phthalic acid is preferred for the practice of this present invention.

In preparing the polyester resin leveling agents of this invention, the phthalic acid and polyolamine can be reacted over a broad range of mole ratios to produce useful resins. For example ratios in the range of 1.00–2.74 moles of acid per one of polyolamine are suitable. Preferably however ratios in the range of about 1.2–1.5 are employed, and the ratio of 1.25:1 is particularly preferred.

The emulsion waxes for which the leveling agents are suitable are those known in the art. The term wax as employed herein is intended to have the broadest possible meaning. It includes the true natural and synthetic waxes as well as wax-like materials. In particular it is intended to include the commonly used materials such as polystyrene, styrene-acrylic copolymers, styrene-acrylonitrile copolymers, zinc cross-linked polymers of styrene and acrylic or methacrylic acid, the homopolymers of methyl-ethyl acrylates and methacrylates, and mixed copolymers of the foregoing acrylates.

The leveling agents of the present invention are useful in emulsion formulations of the above products. Generally these formulations contain about 70 percent by volume of a 15 percent by weight emulsion of one of the foregoing polymers, about 15 percent by volume of a 15 percent by weight emulsion of polyethylene, and about 15 percent by volume of a 15 percent by weight dispersion, emulsion, or solution of the leveling agent. In addition, minor amounts of a plasticizer-coalescent, a fugitive coalescent, and auxiliary emulsifying agents are added as desired, as is known in the art.

The polyester resins of the present invention are easily prepared by charging the polyolamine and phthalic acid to a reaction vessel equipped with an agitator, a heat source, and a distillation column with a take-off head. The mixture, which first forms the amine salt, is gently heated with agitation to about 150° whereat dehydration commences. Rapid heating to this temperature is preferably avoided because it may result in sudden release of water vapor resulting in severe foaming. Once dehydration commences, however, the reaction proceeds smoothly and the heating is continued to about a temperature of 165°–190°C, preferably about 170°C until the acid number is determined to be within the range of about 140–300, preferably within about 230–260. The water of dehydration escapes through the distillation column to the take-off head. When a suitable acid number is reached, the product is cooled- or allowed to cool- to below about 100°C and is then neutralized with an alkanolamine, e.g. ethanolamine, diethanolamine, triethanolamine, 2-amino-2-methyl-1-propanol, 2-amino-1-butanol, or ammonia. Generally the alkanolamine or ammonia is dissolved in 2–4 volumes of water. After neutralization, e.g. to pH 7–9, sufficient water is added to dilute the resinous composition to about 15 percent by weight non-volatile solids. It is then ready for use as a leveling agent.

Resins employing TA and phthalic anhydride (or o-phthalic acid) can be prepared by the above procedure by first reacting the TA with m- or p-phthalic acid in about a 1:1 mole ratio, heating at a tempperature of 150°–190°C to an acid number of about 260 or below, then adding o-phthalic anhydride, in a mole ratio of about 0.5–0.75 moles per mole of TA and continuing to heat to an acid number below about 220. The resulting resin is light colored and when neutralized and diluted as described above, it provides good leveling when employed in emulsion waxes.

The invention will be better understood by reference to the following examples. It is understood however that the examples are intended only for illustration and it is not intended that the invention be limited thereby.

EXAMPLE 1

To a reaction vessel equipped with an agitator, a heat source and a distillation column there were charged tris(hydroxymethyl)aminomethane (TA), 160g (about 1.3 mole) and 2-amino-2-ethyl-1,3-propanediol (AEPD), 120 g (about 1 mole). The mixture was stirred, then meta-phthalic acid, 460g (2.8 moles) was added, giving a mole ratio of acid to TA of 2.5:1. The mixture was heated gradually to about 170°C over a period of about 95 minutes. When the temperature reached 163°C, water of reaction began distilling and by the end of the reaction, 50 ml was collected.

The clear residue had an acid number of 160. It was neutralized with aqueous ammonia to a pH of 7–9 and was then diluted to about 15 percent by weight non-volatile solids with water. The color was 2–3, Gardner scale. It was formulated into an emulsion wax preparation in accordance with the formula set forth in examples 4–7. The resulting wax composition was flowed onto a linoleum tile and allowed to dry. The dried film was inspected visually and it was determined to exhibit excellent leveling and gloss and a very pale color.

EXAMPLE 2

The experiment of example 1 was repeated in all essential details except that the amount of tris(hydroxymethyl)aminomethane (TA) was reduced to 30g (0.25 moles) and the amount of 2-amino-2-ethyl-1,3-propanediol was increased to 240g (about 2 moles) to give a mole ratio of acid to alkanolamine of 2.80:2.25 or about 1.25:1. The resulting resin was clear and had an acid number of 208 and a melting point of 160.4°C. After neutralizing and diluting to 15 percent by weight it had a color less than 2. An emulsion wax formulation containing it showed excellent leveling. After standing 2 weeks, no cloud or precipitate was observable.

EXAMPLE 3

The experiment of example 2 was repeated in all essential details except that the amount of TA was reduced to 25g (0.205 mole) so that the ratio of acid to amine was 2.8:2.225, or 1.26:1. The mixture was gradually heated under an atmosphere of nitrogen to 165°C over a period of about 90 minutes and maintained at that temperature until the acid number was below 250. The final product was clear, nearly colorless and had an acid number of 242. After neutralizing and diluting to 15 percent, the color was less than 2. An emulsion wax containing it showed excellent leveling.

EXAMPLES 4-7

The experiment of example 2 was repeated in all essential details except that differing amounts of tris-(hydroxymethyl)aminomethane (TA) were used, as shown in the table. The color of the leveling resins after neutralizing with ammonia and diluting to 15% solids was less than 2, Gardner scale, in each case.

Shanco 6000 polyester and Shanco 100-9 polyester resins, having a Gardner color of 5-6, were used for comparison purposes. These resins are commerically available from Shanco Plastics Inc., Tonawonda, N.Y. and are typical of widely used leveling agents.

The resins of examples 3-7 plus the two commerical resins were formulated into an emulsion in accordance with the following formula:

| | Emulsion Basis | Solids Basis |
|---|---|---|
| Acrylic-styrene copolymer emulsion (15% solids) | 74 g | 11.1 g |
| Polyethylene emulsion (15% solids) | 15 | 2.25 |
| Leveling agent (15% solids) | 15 | 2.25 |
| Diethylene glycol monoethyl ether | 0.5 | |
| Tri(2-ethylhexyl)phosphate | 0.25 | |
| Fluorohydrocarbon-3M (1% solids) | 0.5 | |

The acrylic copolymer was A-261 manufactured by Polyvinyl Chemical Industries, Leominster, Mass. The polyethylene was AC-629 manufactured by Allied Chemical Co. The fluorohydrocarbon was FC-128 manufactured by 3M Corporation.

These compositions were flowed onto linoleum tile and allowed to dry for about 20 minutes. The dry films were tested for gloss by use of a reflectometer. Leveling was judged by observing the tendency of the formula to flow out on the substrate as opposed to any tendency for the wet film to withdraw from the surface into globules or "fingers". The results are given in the following table.

| Ex. No. | TA | Acid No. | M.P. | Gloss | Level | Mole Ratio, Acid/TA |
|---|---|---|---|---|---|---|
| 2 | 30 | 208 | 160° | 53% | ++ | 1.25 |
| 4 | 30 | 146 | 137 | 53 | ++ | 1.25 |
| 5 | 20 | 186 | 126 | 35 | + | 1.29 |
| 6 | 10 | 205 | 160 | 40 | + | 1.35 |
| 7 | 0 | 208 | 152 | 35 | + | 1.40 |
| Shanco 6000 | 0 | | | 45 | ++ | |
| Shanco 100-9 | 0 | | | 40 | ++ | |

EXAMPLE 8

The experiment of example 4 is repeated in all essential details except that 2-amino-2-methyl-1,3-propanediol is substituted for 2-amino-2-ethyl-1,3-propanediol in equimolar amounts. The resin thereby obtained is a good leveling agent when incorporated in an emulsion wax formula.

EXAMPLE 9

The experiment of example 4 is repeated in all essential details except that terephthalic acid is substituted for meta-phthalic acid. The resin thereby obtained is an effective leveling agent when incorporated in an emulsion wax formula.

Example 10

The experiment of example 4 is repeated in all essential details except that a mixture of meta- and terephthalic acid is substituted for meta-phthalic acid. The resin thereby obtained is an effective leveling agent when incorporated in an emulsion wax formula.

EXAMPLE 11-15

The general procedure of the experiment of example 1 was repeated except that one mole of AEPD was used in each example and the amounts of m-phthalic acid and TA were varied as set forth in the following table. In example 15, the acid was added in 4 increments of 70g each. A period of 2 hours elaspsed between the first and second increments, then 15 minutes between each of the succeeding ones.

| Example No. | Acid, Moles | TA, Moles | Ratio, acid/amine | Temperature, °C | Color | Acid No. |
|---|---|---|---|---|---|---|
| 11 | 3.3 | 0.205 | 2.74 | | <2 | |
| 12 | 1.67 | 0.124 | 1.49 | 178 | <1 | 247 |
| 13 | 1.69 | 0.124 | 1.50 | 175 | <2 | 231 |
| 14 | 1.88 | 0.103 | 1.70 | >163 | <2 | 242 |
| 15 | 1.69 | 0.083 | 1.56 | 190 | <2 | |

EXAMPLE 16

AEPD, 1g mole and m-phthalic acid, 1g mole, were reacted at a temperature of 150°-189°C. When the acid number had dropped to about 160, o-phthalic anhydride, 0.65g moles, was slowly added and heating was continued another 25 minutes. The final acid number was 152. The resulting resin was neutralized with ammonia and diluted to 15 percent solids with water. It had a light yellow color, >3 Gardner. When formulated into an emulsion wax and flowed onto a sample of linoleum tile, the formulation exhibited excellent leveling properties.

EXAMPLE 17

The experiment of Example 16 was repeated in all essential details except that the AEPD and m-phthalic acid were heated at 154° for 1 hour (acid no. about 256) and then the o-phthalic anhydride was added. The mixture was heated another 10 minutes at 185°C to an acid number of 212. The resulting resin was neutralized with ammonia and diluted to 15 percent solids. It had a color of about 1, Gardner scale. When formulated into an emulsion wax and flowed onto a sample of linoleum tile, the formulation exhibited excellent leveling properties.

We claim:

1. A resonous polyester composi-tion consisting of the reaction product of phthalic acid or a mixture of isomers thereof with an aliphatic polyolamine or mixture thereof corresponding to the formula

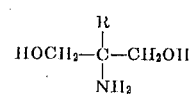

where R is methyl or ethyl in a mole ratio of from about 1.2-2.2 of said acid to said polyolamine.

2. The composition of claim 1 wherein said reaction product is the product of metaphthalic acid with said polyolamine.

3. The composition of claim 1 wherein said reaction product is the product of terephthalic acid with said polyolamine.

4. The composition of claim 1 wherein said polyolamine is 2-amino-2-methyl-1,3-propanediol.

5. The composition of claim 1 wherein said polyolamine is 2-amino-2-ethyl-1,3-propanediol.

6. The composition of claim 1 wherein said polyolamine is a mixture of 2-amino-2-hydroxymethyl-1,3-propanediol in a ratio of about 0.25 mole per mole of a polyolamine of claim 1 wherein R is methy or ethyl, or a mixture thereof.

* * * * *

PO-1050
(5/69)

UNITED STATES PATENT OFFICE
CERTIFICATE OF CORRECTION

Patent No. 3,748,309                  Dated July 24, 1973

Inventor(s) Jerry H. Hunsucker and Daniel G. Mudd

It is certified that error appears in the above-identified patent and that said Letters Patent are hereby corrected as shown below:

```
Column 1, line 10,  "commerical" should be --commercial--
Column 3, line  4,  "merically" should be --mercially--
Column 3, line  4,  "commerical" should be --commercial--
Column 4, line 10,  "tempperature" should be --temperature--
Column 4, line 31,  "2.5:1" should be --2.15:1--
Column 5, line 17,  "commerically" should be --commercially--
Column 5, line 20,  "commerical" should be --commercial--
Column 6, line 15,  "elaspsed" should be --elapsed--
Column 6, line 53,  claim 1, "resonous" should be --resinous--
Column 6, line 53,  claim 1, "composi-tion" should be
                    --composition--
```

Signed and sealed this 16th day of April 1974.

(SEAL)
Attest:

EDWARD M.FLETCHER,JR.                C. MARSHALL DANN
Attesting Officer                    Commissioner of Patents